United States Patent [19]

Crossman et al.

[11] 4,214,650
[45] Jul. 29, 1980

[54] BRAKE ADJUSTER HAVING MULTI-SIDED INTERNAL BROACH

[75] Inventors: Richard L. Crossman, Tallmadge; Robert J. French, Wadsworth, both of Ohio

[73] Assignee: Goodyear Aerospace Corporation, Akron, Ohio

[21] Appl. No.: 933,406

[22] Filed: Aug. 14, 1978

[51] Int. Cl.³ .......................................... F16D 65/54
[52] U.S. Cl. ..................... 188/196 R; 151/21 C; 188/1 C; 188/71.8; 192/111 A; 407/16
[58] Field of Search ............ 188/196 R, 196 P, 71.8, 188/1 C; 192/111 A; 407/13, 16, 17; 151/21 C

[56] References Cited

U.S. PATENT DOCUMENTS

| | | | |
|---|---|---|---|
| 792,884 | 6/1905 | Eicher | 151/21 C |
| 1,449,764 | 3/1923 | LaPointe | 407/13 |
| 2,888,109 | 5/1959 | Tankersley | 188/196 P |
| 3,096,268 | 7/1963 | Lindsay et al. | 188/1 C |
| 3,729,072 | 4/1973 | Borkowski | 188/196 P |
| 3,957,146 | 5/1976 | LeBlanc | 188/196 P X |
| 3,990,547 | 11/1976 | Plaat | 188/71.8 X |
| 4,010,828 | 3/1977 | Ditlinger | 188/196 P X |

Primary Examiner—George E. A. Halvosa
Attorney, Agent, or Firm—P. E. Milliken; E. W. Oldham; R. L. Weber

[57] ABSTRACT

A brake adjuster for implementation between the brake housing and pressure plate of a brake disk stack. A casing is fixedly secured to the brake housing and receives therein a spring follower. Maintained within the spring follower and engaged at one end thereof is a tubular member. Passing through the tubular member and through the casing is a shaft, the shaft being fixedly secured to the pressure plate at a first end thereof and maintaining a multi-sided broach on the other end thereof. The broach is of such geometry as to make contacting engagement with the interior surface of the tube. Upon successive brake applications, the broaching or cutting surfaces of the broach cut portions of the inner wall of the tube, allowing the shaft to telescope from the casing in order to maintain a fixed built-in clearance among the disks of the brake disk stack. There is no frictional engagement between the broach and the inner wall of the tube and, consequently, no difference in the static and dynamic load characteristics of the adjuster.

4 Claims, 5 Drawing Figures

BRAKE ADJUSTER HAVING MULTI-SIDED INTERNAL BROACH

BACKGROUND OF THE INVENTION

Disclosed herein is an invention residing in the art of braking systems and more particularly in braking systems for aircraft. It has been known for many years to utilize a plurality of brake disks, alternately splined to the wheel and axle of an aircraft, to impart a braking force to the aircraft. Such braking is achieved by forcing the alternately splined disks into contacting engagement with each other. Such disks have been found to be quite satisfactory in braking systems but, unfortunately, the same have a tendency to wear with repetitive braking action and, with a large number of disks in a stack, a small amount of wear in each disk results in a large amount of aggregate wear for the system. Consequently, adjustments need to be made to compensate for this wear such that brake pedal travel or brake piston extension and the force imparted to the brake are consistent with braking effort notwithstanding the wear experienced by the brake disk stack. Of course, it is also desirable to provide such adjustment in order that maximum use of the disks of the brake disk stack may be achieved.

Heretofore, various approaches have been taken to achieve brake adjustment. Standard types of adjusters have included frictionally slidable units maintained upon a tube. Using such adjuster mechanisms, it has been found that for any given distance of brake travel or brake application, a variance of loads exists. The force required to overcome the frictional engagement between the slidable unit and the tube changes with successive brake applications such that the force versus displacement curves of such adjusters do not trace each other on successive brake applications. Consequently, as the brake disks wear, the amount of force dissipated in the adjustment step of brake application varies between applications.

Further, in the prior art brake adjusters of the type mentioned above, it has become apparent that there is a difference between the static and dynamic coefficient of friction existing between the tube and the slidable unit. Upon the initial application of brake pressure, the amount of travel experienced by the return mechanism is to take up what is known as the "built-in clearance." The next minute portion of travel is that compensating for brake wear experienced during the prior braking efforts. Following this, the force applied is that referred to in the art as the effective brake force or that actually causing the frictional interengagement between the alternately splined disks. The problem with the prior art teachings is that the static coefficient of friction between the slidable unit and the tube is normally greater than the dynamic coefficient of friction therebetween. Consequently, the force applied to effectuate movement of the standard adjuster must be sufficient to overcome the static and dynamic coefficients of friction as well as the force imparted by the return spring of the spring follower characterizing such adjusters. Should the dynamic coefficient of friction be substantially less than the static coefficient of friction, and the spring of the spring follower be sufficiently strong, the spring follower may return the adjuster to a point where there is no longer a "built-in clearance." The result is a locked brake or a loss of "built-in clearance" for subsequent brake applications, the brakes then being extremely sensitive.

The instant invention relates to a brake adjuster apparatus which circumvents problems of the prior art teachings in a cost effective manner. Particularly, the invention disclosed includes a broaching technique wherein a tubular member is broached by an extendable shaft connected to the brake pressure plate. It has been found that such an apparatus circumvents the frictional problems inherent in the prior art teachings mentioned hereinabove. Certain approaches have been taken in the prior art to achieve a grooving or scoring of a member in a return mechanism to achieve the desired adjustability. Such teachings are found in U.S. Pat. No. 2,888,109, wherein tracks are furrowed or grooved into a sleeve; U.S. Pat. No. 3,957,146, wherein there is an axial cutting of an adjustment member; and U.S. Pat. No. 4,010,828, wherein multiple concentric tubes are axially cut. It will be apparent from the accompanying detailed description of the preferred embodiment that the invention disclosed herein provides advantages over these prior art teachings and over the teachings of the art of frictional engagement of extendable members in a brake adjuster.

OBJECTS OF THE INVENTION

In light of the foregoing, it is an object of the disclosed invention to provide a brake adjuster having a multi-sided internal broach wherein there is no force extended in the adjuster to overcome frictional losses.

Another object of the disclosed invention is to present a brake adjuster having a multi-sided internal broach which is predictable and repeatable in operation such that consecutive brake applications require the same amount of force to achieve the adjusting techniques.

Yet a further object of the invention is to present a brake adjuster having a multi-sided internal broach which is reusable.

Still another object of the invention is to present a brake adjuster having a multi-sided internal broach which is simplistic in design, cost effective, and readily adaptable to utilization in existing brake systems as well as new brake systems designs.

SUMMARY OF THE INVENTION

The foregoing objects and other objects of the invention which will become apparent as the detailed description proceeds are achieved by the improvement of a brake adjuster in a brake assembly having a brake housing and a pressure plate in operative engagement with a brake disk stack, comprising: a casing fixedly secured to the brake housing; reciprocating means maintained within said casing and operative between first and second ends of said casing; a tube in contacting engagement at one end thereof with a first end of said reciprocating means and movable therewith; a shaft received within said tube, said shaft passing through said tube and said first end of said reciprocating means and connected at a first end thereof to the pressure plate; and a broach fixedly secured to a second end of said shaft and in cutting engagement with the interior surface of said tube.

DESCRIPTION OF DRAWING

For a complete understanding of the objects, techniques, and structure of the invention, reference should be had to the following detailed description and accompanying drawing wherein.

DETAILED DESCRIPTION OF THE PREFERRED EMBODIMENT

Figure 1:
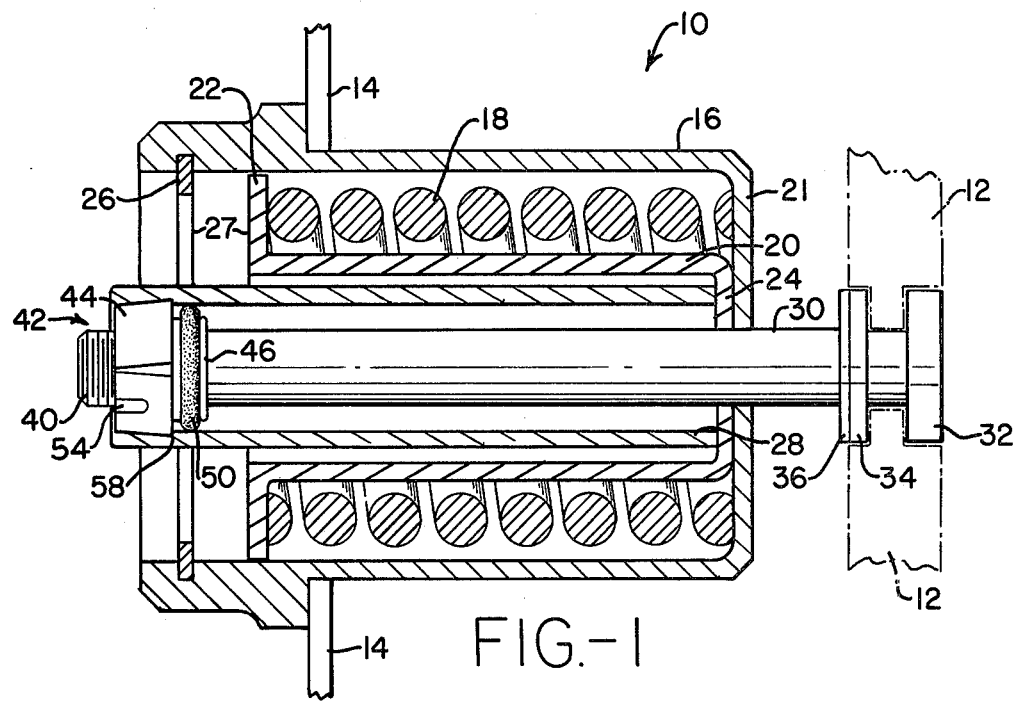
FIG. 1 is a cross-sectional view of the brake adjuster assembly of the invention, showing the same interconnected between a brake housing and pressure plate.

Referring now to the drawings and more particularly FIG. 1, it can be seen that the brake adjuster assembly 10 of the invention is interconnected between the pressure plate 12 of a brake disk stack and the brake housing 14. The assembly 10 includes a casing 16 defining a chamber which receives therein a spring 18 in operative engagement with the spring follower 20. The spring 18 operates between, and in contacting engagement with, an end portion 21 of the casing 16 and a flange 22 of the spring follower 20. When the brakes are applied, as shown in the drawing, a shoulder 24 of the spring follower 20 is brought into contacting engagement with the end portion 21. When the brakes are released, the spring 18 biases the spring follower 20 to return to the quiescent state whereat the flange 22 makes contacting engagement with the keeper or ring 26 maintained within a circumferential groove in the housing 16.

As will be readily appreciated by those skilled in the art, the distance between the flange 22 and the keeper 26, as shown in FIG. 1, is defined as the "built-in clearance." This is the aggregate spacing between the disks of the brake disk stacks when brake pressure is released and the pressure plate 12 is withdrawn from its forceful engagement with the stack. It is one of the objects of this invention to have a constant "built-in clearance" 27 which is unaffected by brake disk wear.

Figure 2:
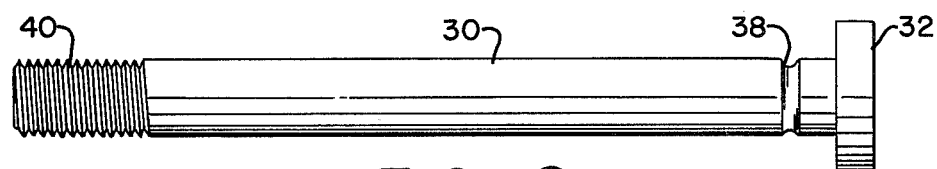
FIG. 2 is a front plan view of the shaft used in interconnection between the pressure plate and the broach.

Received within the spring follower 20 is a tube 28, resting at one end thereof against the shoulder 24. This tube 28, preferably of circular cross-section, receives therein a shaft 30. The shaft 30 may be of any suitable nature but, for purposes of rigidity, it is preferred that the same be of solid metal construction. A head 32 is positioned at one end of the shaft 30 for engagement with a mating recess in the pressure plate 12. A washer 34 mates with a corresponding recess on the opposite side of the pressure plate 12 and is maintained thereon by a keeper 36 which makes engagement with the groove 38 as shown in FIG. 2. It should be readily apparent that the shaft 30 may be passed through the pressure plate until the head 32 seats, at which time the washer 34 and keeper 36 are slid over the shaft 30 and into their retaining position.

Figures 3, 5:
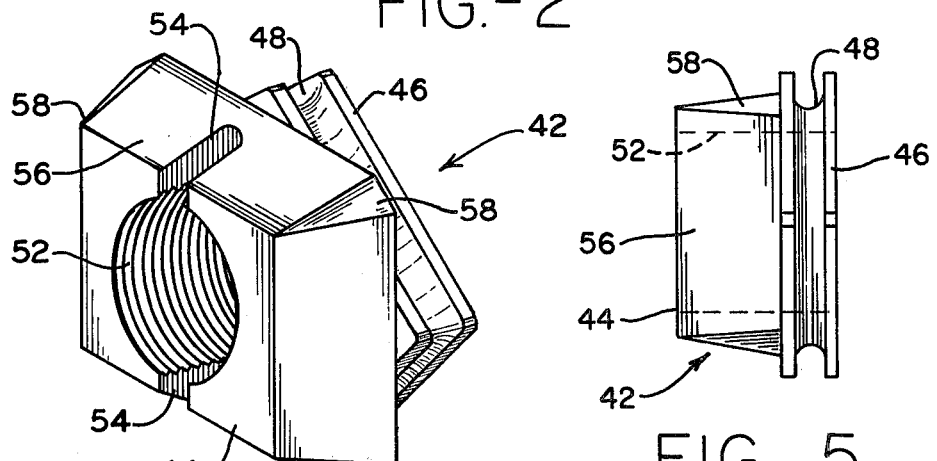
FIG. 3 is a perspective view of the broach implemented in the brake adjuster of the invention.
FIG. 5 is a side plan view of the broach of FIG. 3.

At the end of the shaft 30, opposite the head 32, is a threaded portion 40 which is provided for receiving thereon the broach 42, shown in more detail in FIGS. 3 and 5. The broach 42 includes a top cutting member 44 and bottom guide member 46. In practice, it has been found that the members 44, 46 may be formed from a single piece of metal, although it is conceivable that the two may be separately formed and subsequently securedly attached to each other. The bottom guide member 46 is characterized by a circular groove 48 about the edge thereof for receiving an "O" ring 50, shown in FIG. 1, which sealingly engages with the inner circumferential area of the tube 28. It should also be noted that the guide member 46 is offset with respect to the cutting member 44 such that the corners of the element 46 are equidistant between the cutting edges 58 of the cutting member 44 and define a circle substantially congruent with the inside of the tube 28. These corners provide a guiding surface within the tube, such that the broach 42 does not become cocked or offset within the tube 28, but rather remains centrally positioned therein.

The broach 42 is drilled and tapped to provide threads 52 for mating engagement with the threads 40 of the tube 48. The cutting member 44 is slotted as at 54 across the tapped hole. A slight crimping is then made toward closing the slots 54 such that the threads 52 will have a self-locking effect upon the threads 40. In other words, the crimping of the cutting member 42, facilitated by the slot 54, provides a spring bias of the threads 52 upon the threads 40. Consequently, the broach 42 is tightly held upon the shaft 30 such that the vibratory environment in which the adjuster 10 is utilized does not result in a separation of the broach from the shaft.

It will be noted that the edges 56 of the cutting member 44 are slightly angled and are ground at the corners thereof to provide a hardened cutting surface 58. With the cutting surfaces 58 defining a circle of a diameter slightly greater than the inside diameter of the tube 28, it can be seen that the cutting surfaces 58 will make broaching engagement with the interior of the tube 28. Consequently, the circle defined by the cutting edges 58 is of slightly greater diameter than that defined by the "O" ring 50 received within the grooves 48.

With particular reference to FIG. 1, it can be seen that in operation the shaft 30 is centered within the tube 28 and maintained in such centered position by virtue of the openings in the end portion 21 and the shoulder 24 of the casing 16 and spring follower 20, respectively. Further maintaining such centered position is the "O" ring 50 in contacting engagement with the interior of the tube 28. The cutting surfaces 58 are in shaving or broaching contact with the interior surface of the tube 28. When the brakes are applied, the pressure plate 12 moves to the position as shown in FIG. 1, at which time the shoulder 24 of the spring follower 20 bottoms on the end portion 21 of the casing 16. Further brake pressure applied to the pressure plate 12 tends to pull the broach 42 through the tube 28 to compensate for brake wear experienced in the braking operation. As the broach 42 is pulled through the tube 28, the cutting edges 58 shave the interior of the tube 28 to allow the shaft 30 to telescope from the casing 16 to compensate for the brake wear. On successive brake applications, the broach 42 continues its shaving operation with chips or flakes of the interior of the tube 28 dropping off and passing across the angled sides 56 and onto the runway. The "O" ring 50 prevents such chips or flakes from dropping down between the shaft 30 and the tube 28, thus restricting travel therebetween. The vibratory motion of the aircraft during braking effectuates such dropping of the chips or flakes. As the broach 42 is drawn through the tube 28, the spacing between the end portion 21 and the pressure plate 12 increases as brake wear is experienced. However, the "built-in clearance" 27 is unchanged such that the amount of brake travel on successive brake applications to achieve the same braking effort remains the same. Of course, the shaft 30 is designed to be of a length sufficient to compensate for the desired brake wear.

Figure 4:
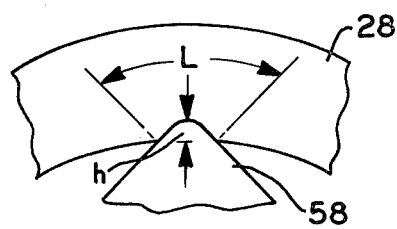
FIG. 4 is a highly illustrative cross-sectional view showing the broaching technique.

With reference to FIG. 4, an appreciation of the design criteria for the instant invention may be had. It has been found that the force required to achieve the broaching technique is dependent upon the specific energy of cutting for the material of the tube 28, the length of the tool edge actually cutting the metal of the tube 28, and the maximum depth of interference of the tool into the material of the tube 28. In other words, it has been found that $F=uLh$, where F is the cutting force, u is the specific energy of the metal 28, L is the arc length of the cut made, and h is the depth of interference. The cross-section of such cutting is shown in FIG. 4. Consequently, the parameters just discussed must be considered in designing a brake adjuster according to the teachings of the instant invention such that a desired percentage of applied force will be applied for brake adjustment purposes with the remainder operating as the effective brake force. Since each aircraft has its own particular requirement for such relationship between applied and effective brake force, design consideration must be uniquely given to each application. It has, however, been found that it is most desirable that the depth of cut of the cutting surface 58 into the tube 28 be of a maximum distance not to exceed one-third of the wall thickness of the tube 28. This is in order to prevent distortion of the tube 28 resulting from inordinate weakening of the same. It has also been found that it is most desirable that the broach 42 be constructed of a hard metal such as a 17.4 pH, Rockwell C45-50, with the tube being of a Rockwell B75-80 character. Both the tube 28 and the broach 42 are preferably of a stainless steel construction to prevent corrosive action from ambient conditions.

It has been found that in utilizing the structure presented hereinabove, the amount of applied force necessary for achieving the brake adjustment is substantially identical for each and every brake application. This is true because the cutting force between two materials is generally more predictable than is the frictional force between such materials. Consequently, the braking effort received from a given applied pedal force will be consistent and predictable for each and every brake application irrespective of brake wear. Yet further, it has been found that the structure of the invention described herein is less expensive to construct than such systems heretofore known and that the system may be easily reused by simply rotating the tube 28 such that the cutting edges 58 broach new surfaces on the interior thereof after a full amount of brake wear has been experienced and the brake disks have been replaced. Of course, the tube 28 might just as easily be totally replaced at no significant cost.

Thus, it can be seen that the objects of the invention have been satisfied by the structure and technique presented hereinabove. While in accordance with the patent statutes only the best mode and preferred embodiment of the invention has been presented and described in detail, it is to be understood that the same is not limited thereto or thereby. Consequently, for an appreciation of the true scope and breadth of the invention, reference should be had to the following claims.

What is claimed is:

1. A brake adjuster comprising:
    a casing;
    a spring follower maintained within said casing and operative between first and second ends thereof;
    a tube in contacting engagement with said spring follower and movable therewith;
    a shaft centrally maintained within said tube, and passing through an end of said spring follower, said shaft being adapted for connection with a pressure plate;
    a broach, having a plurality of cutting edges thereon, connected to said shaft and in cutting engagement with the interior surfaces of said tube; and
    a guide interconnected between said broach and said shaft for centrally maintaining said shaft within said tube, said guide including a plurality of guide points positioned between adjacent cutting edges and a seal about said guide points and in contacting engagement with the interior surface of said tube.

2. The brake adjuster according to claim 1 wherein said guide points are equal in number to the number of cutting edges, said guide points being positioned equidistant between adjacent cutting edges.

3. The brake adjuster according to claim 1 wherein said broach is drilled, tapped, and threaded onto said shaft, said broach being slotted and crimped to provide a self-locking effect on said shaft.

4. The brake adjuster according to claim 1 wherein said tube is of circular cross-section and wherein said cutting edges define a circle of a diameter slightly greater than the inside diameter of said tube.

* * * * *